US010346622B2

(12) United States Patent
Barton et al.

(10) Patent No.: US 10,346,622 B2
(45) Date of Patent: *Jul. 9, 2019

(54) FACILITATING COMMUNICATION BETWEEN MOBILE APPLICATIONS

(71) Applicant: Citrix Systems, Inc., Fort Lauderdale, FL (US)

(72) Inventors: Gary Barton, Boca Raton, FL (US); Richard Hayton, Cambridge (GB); Andrew Carnegie Innes, Cambridge (GB); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,193

(22) Filed: Jun. 27, 2017

(65) Prior Publication Data

US 2017/0293767 A1      Oct. 12, 2017

Related U.S. Application Data

(63) Continuation of application No. 14/704,075, filed on May 5, 2015, now Pat. No. 9,729,520.

(60) Provisional application No. 61/988,525, filed on May 5, 2014.

(51) Int. Cl.
*G06F 21/00* (2013.01)
*G06F 21/60* (2013.01)
(Continued)

(52) U.S. Cl.
CPC ............ *G06F 21/606* (2013.01); *G06F 9/485* (2013.01); *G06F 9/544* (2013.01); *G06F 21/41* (2013.01); *H04L 63/0428* (2013.01); *H04L 67/10* (2013.01); *H04L 63/0272* (2013.01)

(58) Field of Classification Search
CPC ........ G06F 21/606; G06F 9/485; G06F 21/41; G06F 9/544; G06F 63/0272; H04L 63/0428; H04L 63/0272
See application file for complete search history.

(56) References Cited

U.S. PATENT DOCUMENTS 924,993 A       6/1909   Johnson
6,331,816 B1 *  12/2001  Myllymaki ........ G08B 21/0423
                                                340/540
(Continued)

OTHER PUBLICATIONS

Jan. 5, 2016—(WO) International Search Report and Written Opinion—App PCT/US2015/029157.

(Continued)

*Primary Examiner* — David Garcia Cervetti
(74) *Attorney, Agent, or Firm* — Banner & Witcoff, Ltd.

(57) ABSTRACT

Methods and systems for communicating information between mobile applications are presented. In some embodiments, a mobile device may determine that a plurality of applications are running on the mobile device. The mobile device may determine that each application of the plurality of applications uses a shared passcode to encrypt information about a persistent state. The mobile device may generate a beacon that includes encrypted state information. The mobile device may maintain state information across the plurality of applications beyond the lifetime of any one of the plurality of applications by transmitting the beacon from a first application to a second application before the first application's lifetime is completed.

24 Claims, 7 Drawing Sheets

(51) Int. Cl.
  *H04L 29/06* (2006.01)
  *H04L 29/08* (2006.01)
  *G06F 9/48* (2006.01)
  *G06F 9/54* (2006.01)
  *G06F 21/41* (2013.01)

(56) References Cited

U.S. PATENT DOCUMENTS

| | | | | |
|---|---|---|---|---|
| 6,348,867 | B1 * | 2/2002 | Myllymaki | G08B 21/0423 340/506 |
| 6,704,871 | B1 * | 3/2004 | Kaplan | G06F 21/72 713/192 |
| 6,785,811 | B1 * | 8/2004 | Bihlmeyer | G06F 21/602 380/255 |
| 6,985,953 | B1 * | 1/2006 | Sandhu | G06F 21/31 709/229 |
| 7,287,084 | B1 * | 10/2007 | Masters | H04L 63/0428 709/219 |
| 7,441,000 | B2 * | 10/2008 | Boehringer | G06F 16/954 709/203 |
| 7,698,739 | B2 * | 4/2010 | Hasbun | G06F 21/51 380/248 |
| 7,720,975 | B2 * | 5/2010 | Erickson | H04L 29/06 709/227 |
| 7,881,318 | B2 * | 2/2011 | Herzog | H04L 61/2553 370/401 |
| 8,239,926 | B1 * | 8/2012 | Lin | H04W 4/21 726/7 |
| 8,413,210 | B2 * | 4/2013 | Kuzin | H04L 63/0815 726/2 |
| 8,763,102 | B2 * | 6/2014 | Furman | G06F 21/41 726/8 |
| 8,839,395 | B2 * | 9/2014 | Poliashenko | G06F 21/41 713/172 |
| 8,856,887 | B2 * | 10/2014 | Field-Eliot | H04L 63/0807 713/172 |
| 8,923,760 | B2 * | 12/2014 | Iwasaki | H04W 4/38 455/41.1 |
| 9,059,974 | B2 * | 6/2015 | Kim | G06F 21/6281 |
| 9,081,963 | B1 * | 7/2015 | Sima | G06F 21/57 |
| 9,166,782 | B2 * | 10/2015 | Boren | H04L 9/0822 |
| 9,197,608 | B2 * | 11/2015 | Tanizawa | H04L 63/06 |
| 9,225,515 | B2 * | 12/2015 | Volchok | H04L 9/0819 |
| 9,225,516 | B1 * | 12/2015 | O'Connor | H04L 9/0819 |
| 9,240,882 | B2 * | 1/2016 | Tanizawa | H04L 9/08 |
| 9,244,993 | B1 * | 1/2016 | Adoc, Jr. | H04L 67/1095 |
| 9,250,872 | B2 * | 2/2016 | Sullivan | G06F 8/38 |
| 9,250,972 | B2 | 2/2016 | Shwartz et al. | |
| 9,274,780 | B1 * | 3/2016 | Velummylum | G06F 8/65 |
| 9,311,053 | B2 * | 4/2016 | Baughman | G06F 16/212 |
| 9,326,145 | B2 * | 4/2016 | Awan | H04L 63/107 |
| 9,342,492 | B1 * | 5/2016 | Warila | G06F 8/24 |
| 9,385,996 | B2 * | 7/2016 | Quinlan | H04L 63/0428 |
| 9,767,490 | B2 * | 9/2017 | Setton | G06Q 30/0277 |
| 9,866,382 | B2 * | 1/2018 | Wagner | G06F 21/60 |
| 2002/0026478 | A1 * | 2/2002 | Rodgers | G06F 8/65 709/205 |
| 2002/0138551 | A1 * | 9/2002 | Erickson | H04L 29/06 709/203 |
| 2002/0161722 | A1 * | 10/2002 | Matsushima | G06F 21/6263 705/67 |
| 2004/0006602 | A1 * | 1/2004 | Bess | H04L 29/06 709/207 |
| 2004/0117486 | A1 * | 6/2004 | Bourne | H04L 29/06 709/228 |
| 2005/0154872 | A1 * | 7/2005 | McGrew | H04L 63/0435 713/150 |
| 2005/0154887 | A1 * | 7/2005 | Birk | G06F 21/41 713/168 |
| 2005/0173518 | A1 * | 8/2005 | Takayama | G06Q 20/3226 235/380 |
| 2007/0064948 | A1 * | 3/2007 | Tsirtsis | H04W 36/0055 380/270 |
| 2008/0022224 | A1 * | 1/2008 | Coutts | G06F 3/0482 715/783 |
| 2008/0114993 | A1 * | 5/2008 | Shankar | G06F 21/6209 713/193 |
| 2009/0077157 | A1 * | 3/2009 | Ma | G06F 19/321 709/201 |
| 2009/0132813 | A1 * | 5/2009 | Schibuk | G06Q 20/223 713/158 |
| 2010/0257405 | A1 * | 10/2010 | Cabezas | G06F 11/0724 714/25 |
| 2011/0225417 | A1 * | 9/2011 | Maharajh | G06F 21/10 713/150 |
| 2011/0258642 | A1 * | 10/2011 | Onda | G06F 21/53 719/328 |
| 2011/0275358 | A1 * | 11/2011 | Faenger | G06F 9/4856 455/420 |
| 2011/0289192 | A1 * | 11/2011 | Denise | G06F 8/60 709/219 |
| 2012/0050161 | A1 * | 3/2012 | Andersson | G06F 1/1626 345/158 |
| 2012/0062601 | A1 * | 3/2012 | Vuong | G06F 3/0482 345/661 |
| 2012/0110318 | A1 * | 5/2012 | Stone | H04L 9/3234 713/150 |
| 2012/0250858 | A1 * | 10/2012 | Iqbal | H04L 9/0861 380/44 |
| 2013/0055384 | A1 * | 2/2013 | Shulman | H04L 63/1425 726/22 |
| 2013/0238906 | A1 * | 9/2013 | Khoury | G06F 21/6218 713/193 |
| 2013/0318577 | A1 * | 11/2013 | Bulusu | G06F 21/00 726/5 |
| 2014/0082065 | A1 * | 3/2014 | Anakata | H04L 41/0853 709/203 |
| 2014/0096230 | A1 * | 4/2014 | Wade | H04L 63/0272 726/15 |
| 2014/0165112 | A1 * | 6/2014 | Freeman | H04N 21/4122 725/81 |
| 2014/0177839 | A1 * | 6/2014 | Wagner | H04L 9/0822 380/259 |
| 2014/0208116 | A1 * | 7/2014 | Tanizawa | H04L 63/06 713/171 |
| 2014/0259028 | A1 * | 9/2014 | Atwood | G06F 9/543 719/313 |
| 2014/0281499 | A1 * | 9/2014 | Schentrup | G06F 12/1408 713/156 |
| 2014/0281524 | A1 * | 9/2014 | Legacy | H04L 67/10 713/168 |
| 2014/0289195 | A1 * | 9/2014 | Chan | G06F 9/54 707/620 |
| 2014/0289331 | A1 * | 9/2014 | Chan | G06F 9/54 709/204 |
| 2014/0365910 | A1 * | 12/2014 | Laadan | H04W 4/18 715/747 |
| 2014/0379853 | A1 * | 12/2014 | Shelton | G06F 9/4868 709/217 |
| 2015/0082029 | A1 * | 3/2015 | Volchok | H04L 9/0819 713/164 |
| 2015/0121085 | A1 * | 4/2015 | Zhao | H04L 67/02 713/185 |
| 2015/0220457 | A1 * | 8/2015 | Katoh | G09C 1/00 713/193 |
| 2015/0227752 | A1 * | 8/2015 | Anakata | G06F 21/629 726/29 |
| 2015/0310220 | A1 * | 10/2015 | Brooks | G06F 21/606 713/189 |
| 2017/0116424 | A1 * | 4/2017 | Aamir | G06F 21/606 |

OTHER PUBLICATIONS

Oct. 4, 2016—(US) Non Final Office Action—U.S. Appl. No. 14/704,075.

Mar. 30, 2017—(US) Notice of Allowance—U.S. Appl. No. 14/704,075.

* cited by examiner

FACILITATING COMMUNICATION BETWEEN MOBILE APPLICATIONS

CROSS REFERENCE TO RELATED APPLICATIONS

This application is a continuation of and claims priority to U.S. patent application Ser. No. 14/704,075, filed on May 5, 2015, and entitled "Facilitating Communication Between Mobile Applications," which claims priority to provisional U.S. Application No. 61/988,525, entitled "Facilitating Communication Between Mobile Applications," filed May 5, 2014. The disclosures of these two priority applications are incorporated by reference herein in their entirety and made part hereof.

FIELD

Aspects described herein generally relate to mobile computing and mobile communication. More specifically, aspects described herein relate to maintaining persistent state information amongst mobile applications beyond the lifetime of any one mobile application.

BACKGROUND

More and more people are using mobile devices in personal and business settings for a variety of purposes. These devices are often used by employees to access company resources, sometimes from remote or unusual locations. Increasingly, corporations and other organizations are providing and/or otherwise enabling their employees and other associates with mobile devices, such as smart phones, tablet computers, and other mobile computing devices. As these devices continue to grow in popularity and provide an increasing number of business applications, enterprise mobile applications are providing employees with means to access networked enterprise applications from their mobile device. With the proliferation of networked applications, there is an increased need for communication between such applications. However, the short lifetimes of mobile applications presents challenges in communicating information between applications. Therefore, there is a need to maintain information among networked applications beyond the lifetime of any one mobile application.

Furthermore, mobile applications currently rely on a network connection to retrieve shared information necessary to their operation and for communication with each other. Mobile applications are not able to communicate with each other and obtain such shared information when a mobile device is offline. In addition, reliance on a network connection for inter-application communication subjects mobile applications to the latency of network communication and often disrupts timely communication. Therefore, there is a need for a technique to communicate information between mobile applications while the mobile device on which the applications are running is not connected to a network.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards providing efficient, effective, functional, and convenient ways of controlling how mobile applications communicate information between one another in a secure manner. In particular, in one or more embodiments discussed in greater detail below, mobile application communication functionalities are deployed, implemented, and/or used in a number of different ways to provide one or more of these and/or other advantages.

In some embodiments, a mobile device processor may identify a first application that is running on the mobile device. The mobile device may encrypt state information to be transmitted from the first application to a shared location accessible to any application currently running on the mobile device and any application activated at a later time in the mobile device than the first application, resulting in encrypted state information about a persistent state. The mobile device may maintain state information across a plurality of applications beyond a lifetime of the first application by transmitting the encrypted state information from the first application to the shared location in a moving beacon before a lifetime of the first application is completed.

In some embodiments, the mobile device processor may identify that a first managed application and a second managed application that are both running on the mobile device use a shared passcode. The processor may encrypt state information present in the first managed application using the passcode, resulting in encrypted state information. The processor may generate, at the first managed application, a beacon that includes the encrypted state information for transmission to other applications in order to preserve the state information after termination of the first managed application. The processor may transmit the beacon from the first managed application to the second managed application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards communicating secure information across mobile applications implemented on a mobile computing device. Managed mobile applications running within a secure environment may transmit secured state information to other managed mobile applications running on the mobile device within the same secure environment. These mobile applications may communicate secure information using moving beacons. The moving beacons may include authentication information used by each of the managed mobile applications and liveliness information that specifies when the user was last active within a particular mobile application, amongst other types of secure information. Each of the moving beacons may also be encrypted with a shared passcode that is used by each of the mobile applications that transmit and receive the moving beacons. The moving beacon may be used to preserve the global state of all managed applications even while individual applications that access and alter the global state may terminate. The moving beacons may capture the state from one application and pass to another application. The application receiving the moving beacon may retrieve captured state information from the moving beacon to update its own information. The application receiving the moving beacon may also update the state information in the moving beacon and transmit the modified beacon to other applications. Multiple moving beacons may move around different applications that are running at a given time trying to capture as much state information as possible.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
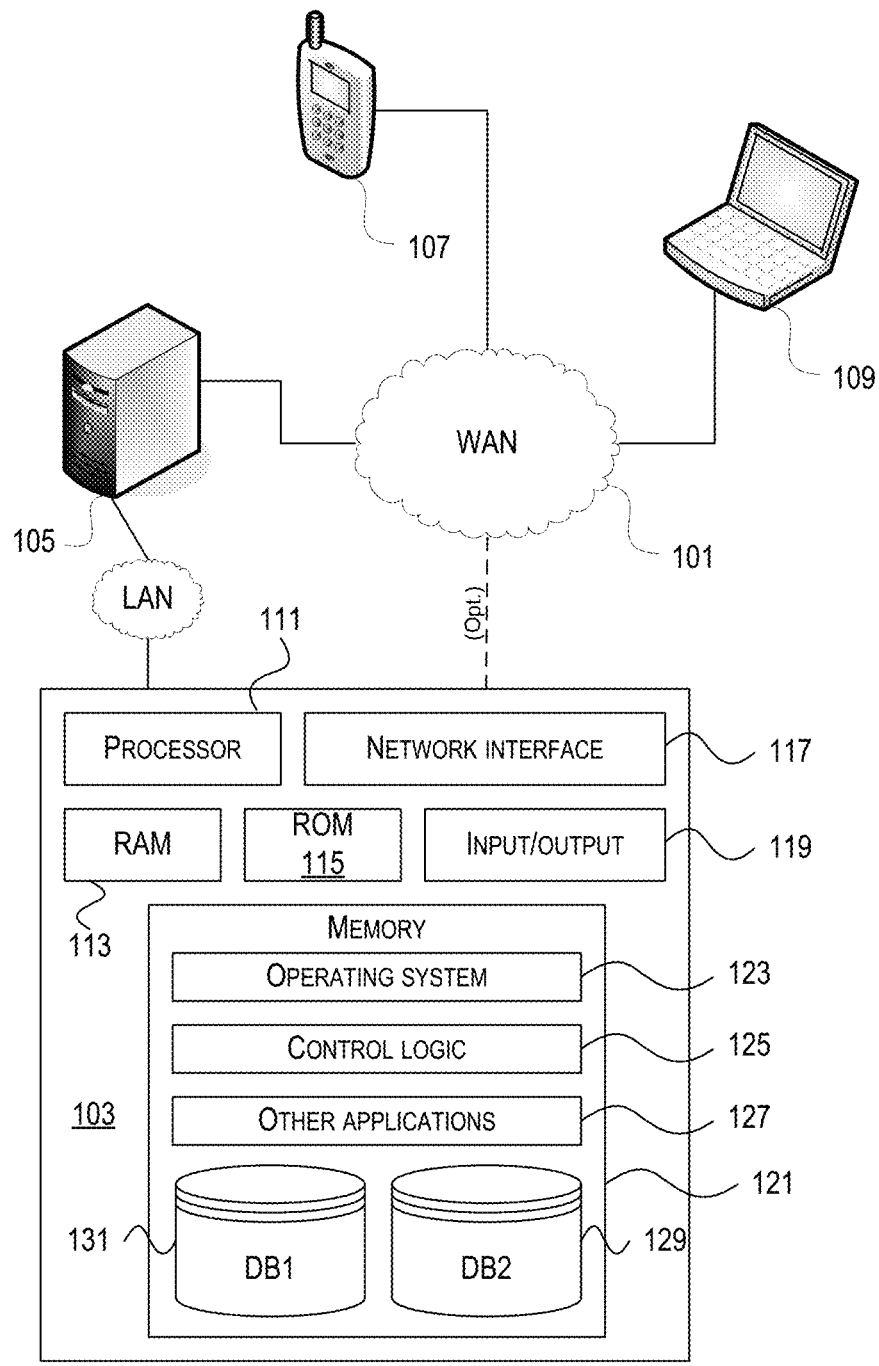
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
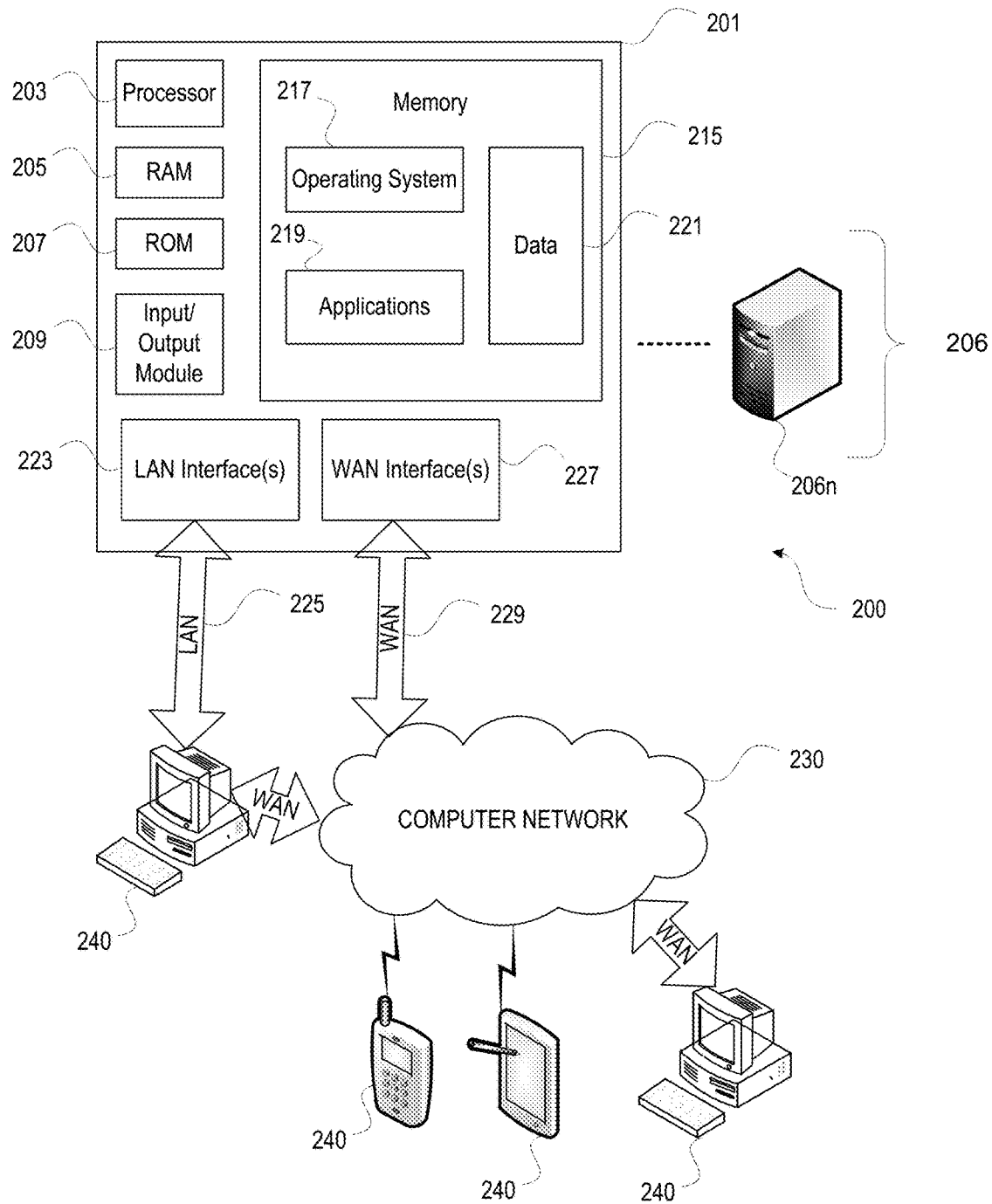
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be a mobile computing device configured to provide access to managed applications to its users in a secure environment. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
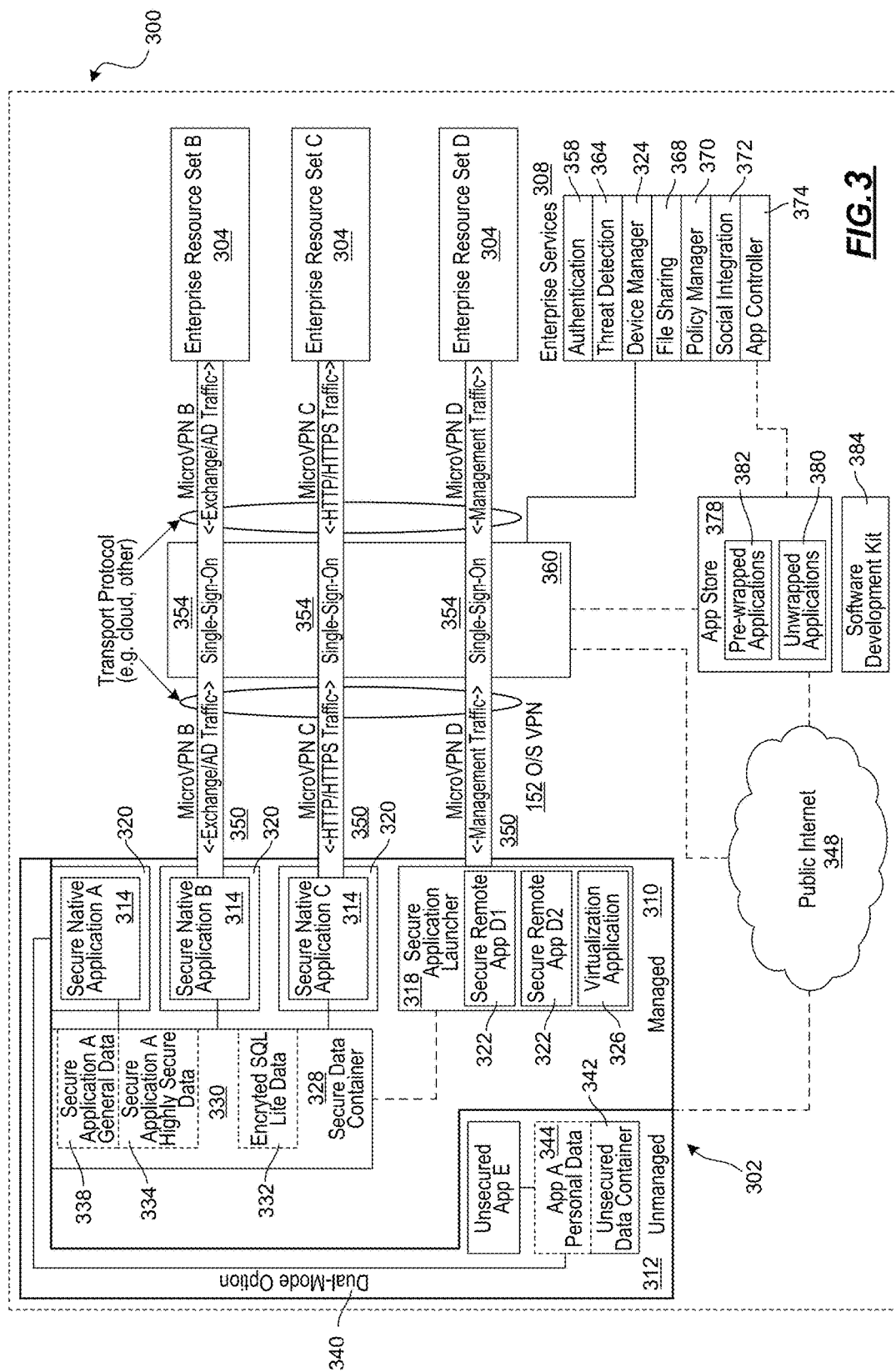
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
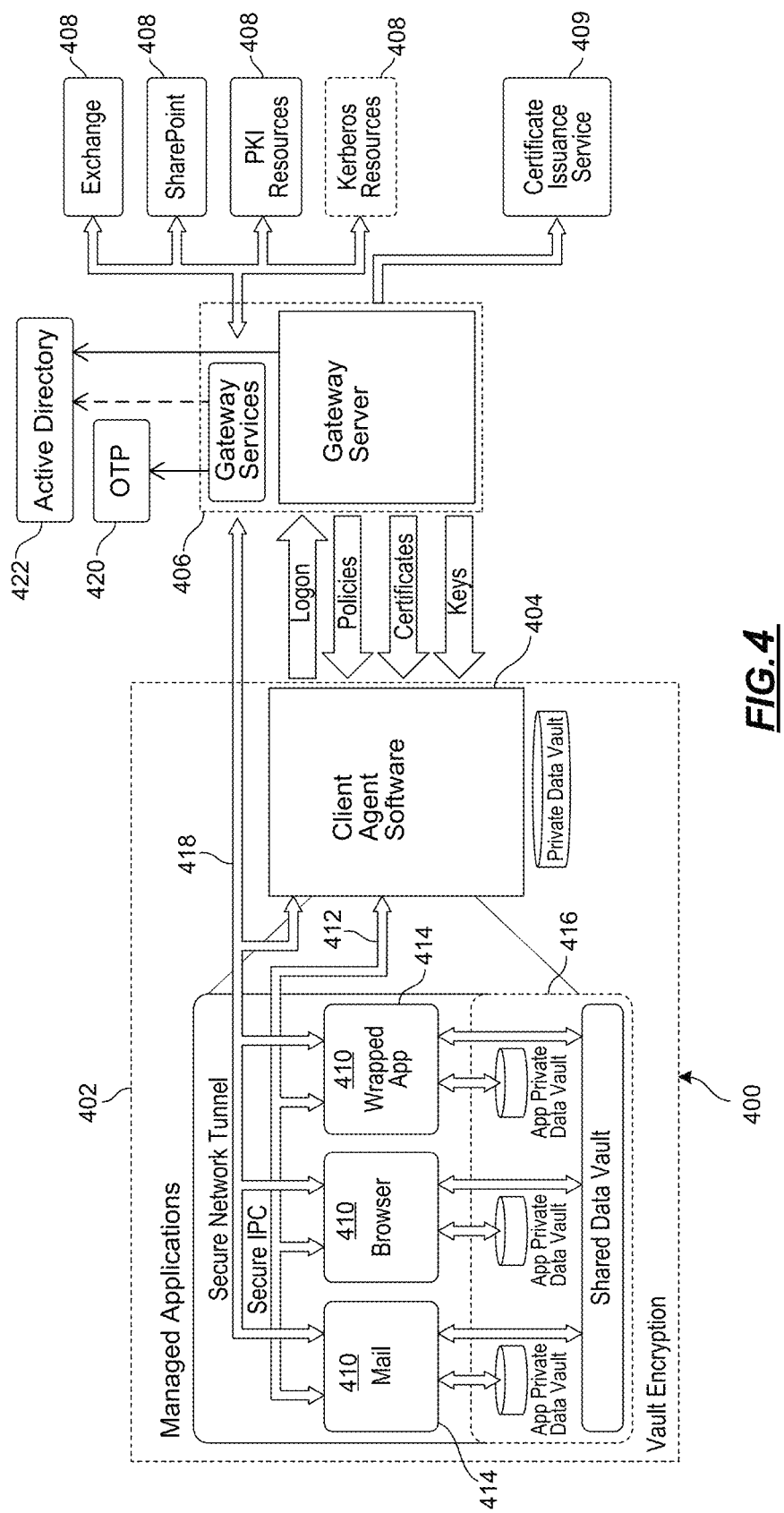
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406

(including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to maintaining an active state of the managed applications on a mobile device within a secured application management framework by passing moving beacons between different applications. Such moving beacons may capture the last updated state as they pass through each application by allowing applications to alter the state information data included in the beacon. Moving beacons may provide each managed application that they pass through with the last updated state that the beacons have captured.

Illustrative Embodiments

As discussed above, a managed application may execute on a device connected to a secure network, and the managed application may communicate information to other managed or unmanaged applications using beacons. Beacons may be passed between applications that share the same passcode. For example, managed applications that are secured within a secured environment on the mobile device using a shared passcode may communicate secure information with each other using moving beacons. The shared passcode used by each of the managed applications may be used to generate encryption and decryption keys at each of the managed applications that can be used to encrypt and decrypt secure information in each beacon.

Throughout the disclosure, the term "beacons" and "moving beacons" are used to refer to data packets encapsulated in a data container. In some embodiments, the moving beacons may comprise network addresses (e.g., URLs) to locations that contain information needed by a mobile application to perform several of its application functions. The moving beacon may be used by a mobile application to retrieve data from a location addressed in the beacon's URL. The location referred to in the URLs of moving beacons may be an encrypted storage area within the secure environment of the mobile device. Mobile applications may modify and/or write to such an encrypted location referred to in the beacon's URL and this may be referred to as writing to the beacon. Upon receiving a moving beacon, a mobile application may also read the information referred to in the moving beacon's URL, which may be hereinafter referred to as reading from the beacon. In some other embodiments, moving beacons may comprise encrypted data packets and may travel from one mobile application to another and may comprise packets of information that may be edited by applications that are able to decrypt the encrypted information included in the moving beacon. For example, managed mobile applications may be able to edit the encrypted data packets stored in a moving beacon and read the encrypted information whereas unmanaged applications may not have the privilege to read and/or write to the moving beacons even if they have received the moving beacon.

In some embodiments, moving beacons may include information about a saved state of a mobile application. An application may capture information about its current state and include such state information in a shared location on the mobile device referred to by the beacon's URL. In another embodiment, a mobile application may capture information about its current state and include data packets of such information directly into the moving beacon. The moving beacon may travel from one application to another application, where it may be edited or read and may be used to include state information to preserve the state of multiple different mobile applications beyond the execution lifetimes of such mobile applications. When the mobile applications are re-instantiated, re-launched, and/or restarted after being terminated and/or suspended, the mobile application may receive the moving beacon and reload the state information previously saved in the moving beacon at an earlier execution state. Upon reading the state information from the data packets contained in the moving beacon or the shared location referred to in the moving beacon's URL, the mobile application may be able to reload their previous execution state.

State information about a persistent state may be encrypted at a managed application for transmission to another location. Such state information may be included in a medium that is shared between different applications and storage locations, both local and remote to a mobile device. In several embodiments, beacons may be used as the shared medium used to communicate such encrypted information between applications and local or remote storage locations. Encrypted state information may be transmitted to a shared location by one application for use by other applications. In some embodiments, an application may transmit encrypted state information to both a remote server and to a local memory location in its mobile device. A second application that wishes to retrieve such state information may retrieve the beacon stored either in the local memory storage or the remote server. The second application may become activated long after the first application has terminated but the state information may be preserved by storage in a shared location using a shared medium such as a moving beacon.

The advantage of storing the state information locally is that the state information is readily retrievable in off-line mode (i.e., when the mobile device is not connected to a network), and that the state information is not susceptible to latency, where real-time data sharing is desired. The advantage of storing the state information is that the state information can be more readily shared between devices, monitored, logged, controlled, and restored. Accordingly, in some embodiments, an application may store encrypted state information in both local and remote locations.

In an embodiment, encrypted secrets that are device specific or user-specific may only be stored locally at the mobile device. For example, passcode authentication data and the encrypted keys may be stored locally only. In another embodiment, some state information may never be directly stored, but rather derivative information based from such state information may be stored for validation purposes. For example, the passcode may never be stored at any location, whether local or remote to prevent loss of such sensitive information during malicious attacks. Instead, passcode validation messages that are paired with the passcode to authenticate a user upon successful user entry of the passcode may be stored.

Figure 5:
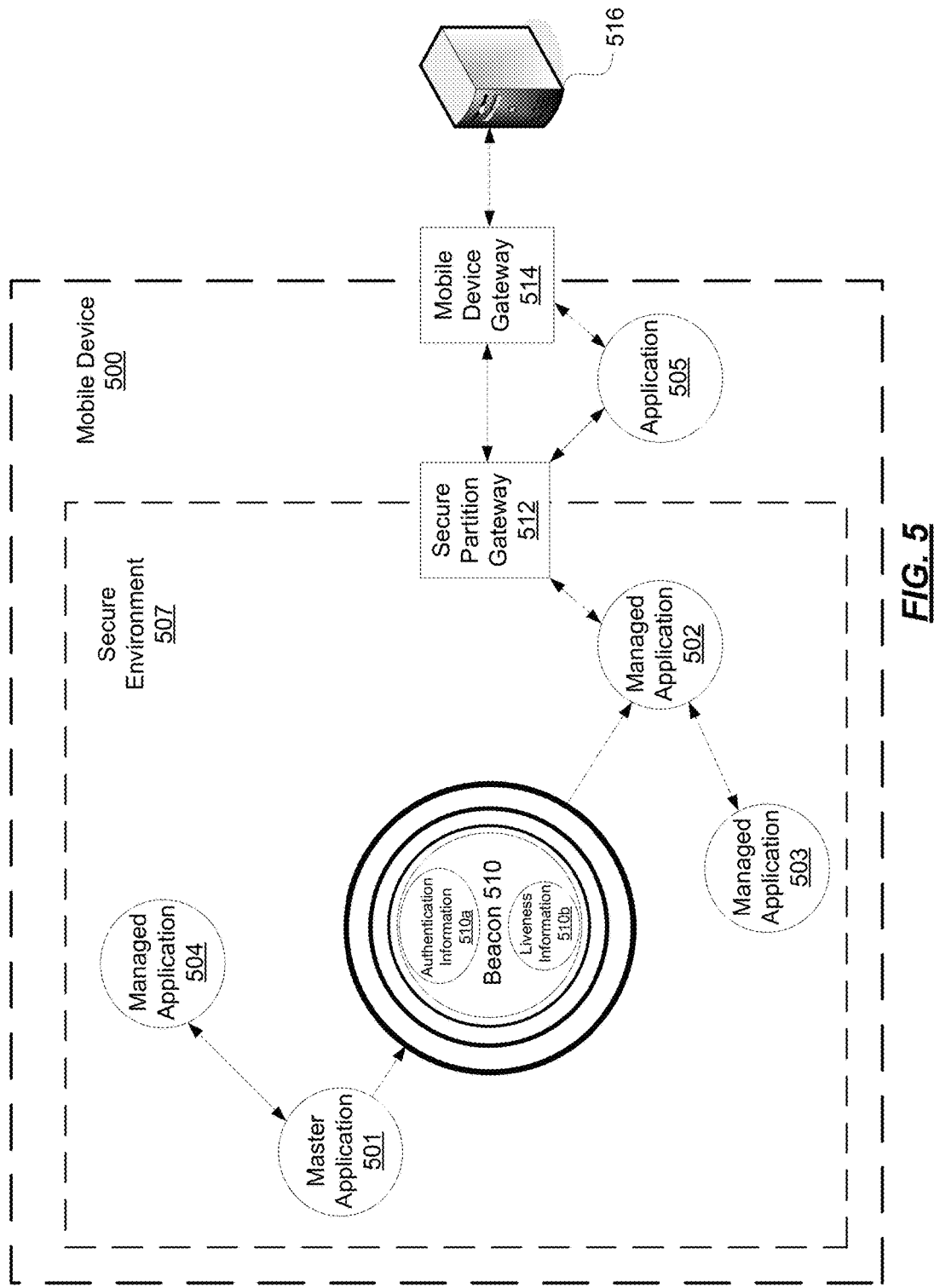
FIG. 5 depicts an illustrative communication protocol between applications on a mobile device in accordance with one or more illustrative aspects described herein.

In some embodiments, a master application 501 may manage a secure environment 507 in which managed applications such as managed application 502, 503, and 504 may run, as depicted in FIG. 5. The master application 501 may include links to all managed applications that it supports, the selection of which may launch each managed application within secure environment 507. The secure environment may correspond to managed partition 310 of FIG. 3. A secure environment 507 may be generated in the memory of mobile device 500 upon launch of master application 501. Secure environment 507 may continue to exist in the memory of mobile device 500 even after master application 501 is terminated. In some other embodiments, secure environment 507 may be generated independent of any master applications. For example, secure environment 507 may be generated in the memory of mobile device 500 upon launch of any managed application.

Upon initialization, master application 501 may prompt the user of mobile device 500 to enter a passcode. The passcode used by the master application 501 may be used to secure all data and communications related to master application 501. For example, data generated by master application 501 for storage, data being transmitted by master application 501 to other managed applications 502-504, and unmanaged application 505 may be encrypted using an encryption key that is derived using the passcode. The passcode used by the master application 501 may also be used by managed applications 502-504 to enable single sign on services. For instance, if a user has entered the passcode when launching master application 501, then any managed applications such as applications 502-504 that are launched from master application 501 may be launched without prompting the user for a passcode once again. Entry of the passcode may grant access to the secure environment 507 within which managed applications operate.

In some embodiments, managed applications 502-504 along with master application 501 may communicate information amongst each other using moving beacons. In the example depicted in FIG. 5, master application 501 may communicate information about a global state to managed application 502 using beacon 510. Applications may retrieve and store updated state information from beacon 510.

In some embodiments, each application may be able to preserve its current state by passing state information to other applications, so that each application may be able to resume its action seamlessly from where it left off when the application which was once paused in favor of a different application is once again resumed. As an example, when a user who is currently listening to a recorded audio file using a file sharing application's audio player receives a new email, the user may choose to open the mail application to view the new email. For example, when the user selects a banner notification informing him of a new email while listening to the shared audio file, the mobile device's processor may pause playback of the audio file and store the last playback position of the audio file, store the security information needed to maintain a login to the file sharing application including active session certificates and tokens in an encrypted form in beacon such as beacon 510. The mobile device processor may place the file sharing application in the background and display the email application so that the user can read the new email. The mobile device processor may pass the beacon 510 from the file sharing application, now running in the background, to the email application now running in the foreground. In an implementation, the state information included in the beacon may contain the security information needed to login into the Exchange server required to access the email. Once the user has finished using the email application, the user may return to the file sharing application and accordingly the mobile device processor may generate the display of the file sharing application on the mobile device screen in the foreground. At this point, beacon 510 may return to the file sharing application from the email application and supply the file sharing application with information needed to resume playback of the audio file (i.e., authentication information needed to access the audio file on a shared media server, identification of which audio file was being played, last playback position etc.).

In some embodiments, when a first application is put in the background in favor of a second application to be displayed in the foreground of a mobile device, beacon 510 may be transmitted from the first application to the second application. When the second application is put in the background in favor of a third application to be displayed in the foreground of the mobile device, beacon 510 may be transmitted to the third application. Beacon 510 may update its stored state information as it passes from one application to another, collecting information from each of the applications that it passes through. Beacon 510 may include information needed to resume the operation of each application that it passes through without prompting the user for additional information that the user has supplied at one point.

Moving beacon 510 may be transmitted from one application to another. When moving beacon 510 is received at an application, the application may retrieve the state information stored in beacon 510 and update the application with the secure information necessary to perform the functions of the application without having to unnecessarily prompt the user for authentication credentials that the user has previously provided to one of the previously running applications. Such authentication credentials, such as passwords, security certificates, encrypted key encryption keys, passcode or PIN validation message etc. may be stored in beacon 510 and may not need to be generated or retrieved by prompting the user to perform certain authentication operations.

Beacon 510 may travel from one application to another application in secure environment 507 amongst a network of managed applications. Each managed application in the secure environment 507 may be a node in the network of applications and the moving beacon 510 may be transmitted from these applications using routing algorithms such as spanning tree or election algorithms. For example, in one embodiment, each application may be in communication with only one other application, its nearest neighbor in accordance with spanning tree routing algorithm. A nearest neighbor may be an application that has the lowest communication delay when compared to other applications in the secure environment 507 (i.e., managed application 504 and master application 501 may be neighbors of managed application 502). Beacon 510 may be communicated from one application to another application in such a mesh network of applications using a pre-established path in accordance with spanning tree routing algorithm.

In another some embodiments, beacon 510 may be transmitted to managed applications by a leader application in accordance with election type network routing algorithms such as bully election algorithm or ring election algorithm. Each application in secure environment 507 may be a network node. An application, either a master application or even a managed application, may be elected as the coordinator node and be in charge of routing beacon 510 to and from different applications within secure environment 507. When an application is terminated (e.g., application crashes or the user closes the application) or when the first application is launched within the secure environment 507, an election may be conducted to select a coordinator application responsible for moving beacon 510 around the different nodes. If the coordinator application is terminated, a new election may be held to elect a new coordinator application from the applications that are alive within secure environment 507 with accordance to election type algorithms such as bully election or ring election algorithms.

In some embodiments, beacons may be sent from applications within secure environment to applications outside the secure environment 507, such as application 505, or even to a server remote from mobile device 500 such as remote server 516.

Moving beacon 510 may include a beacon frame which provides the 'heartbeat' or information about the current global state within a secure partition in a mobile device such as secure environment 507. Moving beacon may include secure information such as passwords, security certificates needed by mobile applications, information used to construct encryption keys, application management policy descriptors, PIN or passcode validation messages, encrypted encryption keys, logon information, application usage information, device check uniform resource locators, and active session tokens. Such information may be referred to collectively as state information. Such state information may be passed from one application to another in order to avoid querying the user at each managed application for passwords to features that were used by an application the user has previously accessed. In some embodiments, beacon 510 may be periodically sent from one application to another to send the most updated state information. For example, if a user is using a secured Internet browser managed application, the browser application may periodically send beacons to at least one other application in secure environment 507 with updated information. For instance, as the user interacts with the browser application, new security certificates and active session tokens may be generated, additional files may be downloaded, the amount of time remaining until the user has to enter the passcode again to be logged into security environment 507 may be updated. Such information may be needed by other managed applications as well for smooth operation. Accordingly, even if an application is running in the foreground and has already sent a beacon to other managed applications once, the application may periodically send beacons such as beacon 510 to at least one other application in secure environment 507 so that other applications have updated state information. As another example, if a user is using an enterprise (managed) application store application, the store application may periodically send beacons to at least one other application in secure environment 507 with updated information. For instance, updated application management policy descriptors may be communicated, updated expiration times for each application management policy may be set. The store application may be a master application 501 or a managed application 502-504. In other embodiments, managed application 502-504 may request updated application management policy descriptors from the store application, when an existing policy expires.

In some embodiments, moving beacons may be transferred from one application to another at the launch of a new application. When a second application launches from a first application, the first application may transmit beacon 510 to the second application along with other information needed to initialize the second application. For example, the first application may provide access to data files and libraries, resource pointers, and other initialization information required to launch the second application. At application launch, beacon 510 may also be passed from the first application to the second application to provide necessary information for the implementation of the second application. For example, beacon 510 may provide the second application about to be launched with authentication information, information about the liveness of any other applications in secure environment 507, any session tokens that have already been generated, etc. By receiving such information at application launch, the second application is able to seamlessly begin operating without having to prompt the user unnecessarily for information the user has previously entered in other applications.

In some embodiments, a first application that is launching the second application may also send information necessary for the second application to communicate with the first application. In one implementation, the first application may transmit globally unique identifiers to define its file type. Each managed application may be aware of the file type and globally unique identifier associated with the other managed applications running in secure environment 507. Such globally unique identifiers may be used to initiate callbacks to the first application from the second application that is newly launched if the first application requires communication with the second application to complete launch of the second application. The first application may include its file type global unique identifier in a request made to the second application if the request requires a response. As an example if master application 501 launches managed application 502, managed application 502 may request policy refresh from master application 501, in which case managed application 502 may use master application 501's well-known file type global unique identifier to call, and may supply its call-back file type global unique identifier in the request. Master application 501 may retrieve the new set of policies from a remote server (i.e., server 516) and may respond by invoking managed application 502 based on the previously specified global unique identifier, and supplying the retrieved policies. Such global unique identifiers may be stored in beacon 510 transmitted between the first and second applications.

In another embodiment, managed applications may communicate with each other using uniform resource identifiers (URIs). Use of URIs may allow each application address each other over a network. Such a protocol for addressing applications may be used in conjunction with other addressing mechanisms when an application is retrieving information from another application through a remote server such as server 516. For example, when an application passes beacon 510 to remote server 516 for remote storage (in the event that no other applications are currently running in secure environment 507), the application may assign beacon 510 with a URI so that an application that is activated at a later time may be able to address the remotely stored beacon from server 516 and retrieve information necessary from beacon 510 for its own successful execution.

In some embodiments, beacons such as beacon 510 are passed around applications in mobile device 500 to preserve the global state information beyond the lifetime of any particular mobile application. Mobile applications typically do not have very long lifetimes. They are either shut down by a user, they may crash, restart due to a mobile device restart, be terminated when a mobile device shuts down etc. In order to preserve state information past any such application termination event, managed and unmanaged applications may pass beacons around to several applications as soon as each of these applications has received a beacon in order to minimize the risk of not having shared state information with other applications prior to its termination. For example, as soon as an application receives a beacon from a different application, often when the application is launched, the application may decrypt and download the state information encoded in the beacon, update the state information stored in the beacon if necessary, and then pass the beacon to another application promptly in order to minimize the risk of losing such state information if that application terminates. In another embodiment, an application may generate and send a beacon with updated state information anytime the state information needs to be updated with changes incurred due to activities related to that application. In some embodiments, applications may broadcast multiple moving beacons to different destinations simultaneously in order to further minimize the risk of losing state information in the event that more than one mobile application terminates within a relatively short period of time before it has the chance to retransmit state information using its own beacons. Each application in a network of applications may strive to maintain the state information at as many locations as possible in order to prevent loss of state information in the event that multiple applications are terminated. In some embodiments, there may be multiple identical beacons moving around a network of applications in secure environment 507 at any given time carrying state information from one application to another to prevent data loss in case multiple applications terminate unexpectedly.

In some embodiments, beacons such as beacon 510 may include liveness information for several managed applications. Beacon 510 may include an indication of how long ago, the user was actively using each particular application in secure environment 507. When an application that was previously being used is paused, placed into the background in favor of a different application, and is later resumed, the mobile device processor may determine whether the user has been inactive with respect to the recently resumed application for a period of time that is longer than a threshold time limit beyond which user authentication is needed to use that application.

In an embodiment, each application may initiate an inactivity timer once that application is placed in the background of mobile device 500 in favor of a different application. In some embodiments, no user re-authentication may be required if a user who is using a managed application switches to another managed application that was previously running. However the user may be prompted to re-authenticate when he uses an unmanaged application for too long a time, having placed a managed application in the background beyond a threshold amount of inactivity time, and returns to using the managed application. Managed applications may not need to be re-authenticated if the user does not use an unmanaged app but instead places a first managed application in the background in favor of a second managed application running within secure environment 507 even if the first managed application has been inactive for a period of time longer than its threshold inactivity time. As long as the mobile device user is using managed applications running within the same secure environment 507, re-authentication may not be required when a managed application that had been placed in the background is resumed since all managed applications within the same secure environment 507 may share the same password. The inactivity timer may be continuously reset for each managed application if the user is actively using another managed application. However, that same inactivity timer may continue to run without resetting if the user has switched to an unmanaged application, leaving use of applications running within secure environment 507. For example, a mobile device processor may determine which application the user is currently using and if that application is an unmanaged application, such as application 505, the mobile device processor may choose to not reset the inactivity timers of each managed application running in the background. However, when the mobile device processor determines that the user is using a managed application, such as applications 501-504, which run inside secure environment 507, the mobile device processor may periodically reset the inactivity timers associated with each managed application running in the background. In some embodiments, the current state of each application's inactivity timer may be captured in a moving beacon 510.

In some embodiments, a security group may set policies for a set of applications. Applications that belong to the security group may conform to the policies set by the security group. Security group policies may be set for inactivity timer usage, sharing active sessions, limiting the amount of application data shared between member applications of the security group, setting levels of restrictions for the types of data each application within the security group has access to. For example, a security group for administrator level master applications such as master application 501 may set policies that allow the master application to modify application data for another managed application, terminate a managed application, change the passcode used for all managed applications etc. Since managed applications may not be members of such a master application security group level, managed applications may not be allowed to have access privileges to the same functions as master applications such as master application 501. Similarly, unmanaged applications may not be subject to more relaxed password re-authentication rules in effect for managed applications that are part of a managed application security group. There may be different security groups even for managed applications. One set of managed applications within a first security group may have more relaxed security processes compared to another set of managed applications within a second security group. For example, managed applications that are members of a first security group may require password re-authentication if a user switches from using an unmanaged application to one of the first security group managed applications after a period of time greater than five minutes whereas a second security group may set this inactivity timer threshold to ten minutes. Different sets of managed applications that use different passcodes may belong to different security groups. Policies that are established for a security group may apply to only applications that belong to that security group.

In some embodiments, information stored in beacon 510 may be encrypted using the shared password used by each of the applications interacting with beacon 510. When a beacon is generated, information stored in beacon 510 may be encrypted using encryption keys that are generated using the passcode used by the application. The same beacon 510 may only be passed between applications that use the same passcode. Accordingly, each application that receives beacon 510 is able to decrypt the information stored in beacon 510 since that application can generate the correct decryption keys using the shared passcode. Encryption and decryption keys may be maintained locally at each application and may be regenerated every time the shared passcode used by the set of applications is updated. In some embodiments, various different encryption and/or cryptographic algorithms may be used to encrypt the information stored in beacon 510. Encryption algorithms may be selected from an application programming interface (API) provided by the operating system of the mobile device (e.g., APIs from Windows::Security::Cryptography namespace). Encryption algorithms that conform to certain standards such as the Federal Information Processing Standard (FIPS) may be used to encrypt the information in beacon 510. In some embodiments, the operating system of the mobile device 500 may place the device 500 in an operating mode governed by the FIPS standard to perform encryption of the information in beacon 510. Such standardization of the mobile device 500 under the encryption APIs may allow the different components of the mobile device 500 (e.g., managed applications 501 504, managed application 505, secure partition gateway 512, and mobile device gateway 514) to be able to interact with the encrypted beacon 510 and with one another in a secure manner.

In another embodiment, the information that one application needs to communicate to another application may be stored in a password protected storage unit of mobile device 500 independent of any application. Each application may unlock the password protected secrets for use or updates by using a key encryption key. Once a user has successfully authenticated with master application or any managed application by entering a passcode, that passcode may be compared against a passcode validation message communicated between applications. The passcode validation message may not be the passcode but may be information that when paired with a correct user entered passcode unlocks the encrypted key encryption and decryption keys at each application. Upon unlocking the encrypted key encryption and decryption keys, each application may use such keys to unlock the secrets stored in a password protected storage unit.

In some embodiments, a passcode validation message may be a tuple comprising an encrypted and/or hashed random pass-phrase, along with the original pass-phrase. The encryption of the pass-phrase may be performed using the passcode as a seed. The passcode validation message may be stored in application isolated storage or password vault and can be shared between master application 501 and other managed applications 502-504. The passcode validation message may be used to validate the passcode after the user is prompted for it. Whenever a passcode is required by a managed application, the managed application may generate a user interface prompt for the user to enter the passcode. Each managed application may handle obtaining the passcode directly from the user without requesting the master application 501 for the passcode. Validation may be performed by decrypting the stored encrypted or hashed random passphrase using the passcode supplied by the user as a seed, and then comparing it to the stored original pass-phrase. After the passcode is validated, the validated passcode may be safely used to decrypt data encryption keys. The data encryption keys are then used to decrypt the application data. The passcode validation message may be stored in an application isolated storage unit and/or a password vault within the mobile device 500. The passcode validation message may be exchanged between the master application 501 and managed applications 502-504 using IPC protocols.

In some embodiments, managed applications such as managed applications 502-504 and master application 501 may communicate with each other using different inter-process communication (IPC) schemes. In one embodiment, master application 501 may communicate with the managed applications 502-504 using URI protocols. In other embodiments, globally unique identifiers (GUIDs) may be used to define file type associations (FTAs) to minimize the possibility of accidental collision between different application to application communications and to obfuscate the application to application communications between the managed applications 502-504 and master application 501 from an external process outside the mobile device 500 and even outside the secure environment 507. For example, the IPC messages exchanged between the master application 501 and the managed applications 502-504 may be encrypted and/or packetized with GUIDs of the applications and/or the respective FTAs of the communications and/or files exchanged between the managed applications 502-504 and master application 501. The master application 501's GUID may be well known to only the managed applications 502-504 and the managed applications 502-504. The IPC communications between the managed applications 502-504 may be embedded with the master application 501's GUID. In an example IPC message, the sender application may include its own FTA and/or GUID in the request to communicate with a recipient application so that the recipient application may call back to the sender application if the request requires a response from the recipient application. In the request, the sender application may include the FTA and/or GUID of the recipient application.

Various different types of data may be exchanged between managed applications 502-604 and master application 501 using IPC protocols. Information exchanged between managed applications and the master application using IPC protocols described above may include enterprise application management framework policies, access gateway cookies and/or tickets, active directory credentials, login information for different managed applications, user certificates, device check URLs for application wiping and locking, and application specific data (e.g., target URL to launch in a web browser managed application, session configuration file to launch a remote application or desktop session). Each applications' data may be cached within its respective mobile application to avoid inadvertent IPC and/or user interface data flips. Encrypted encryption keys (e.g., data encryption keys) that are used to encrypt and/or decrypt data in each managed application may also be exchanged between the master application 501 and managed applications 502-504 using IPC protocols.

In some embodiments, FTA files used in IPC communications may be encrypted. For example, each IPC FTA file may be encrypted with a publisher device identifier (PDID). The PDID may be a randomly generated unique string of numbers and/or characters generated by the processor mobile device 500 based on a combination of the local device identifier and an enterprise identifier. A PDID may be unique to each different enrollment session of each user with each mobile application. For example, different users may be assigned differed PDIDs when they login to the same mobile application and the same user may be assigned a different PDID for each different enterprise that he or she enrolls their mobile device 500 with. The processor of the mobile device 500 may make the PDID available only to mobile applications included in the secure environment 507 (e.g., managed applications 502-504 and master application 501). The enterprise management system may use PDIDs as a shared secret used for encryption of messages exchanged between managed applications in the course of secure IPC and as an additional seed for data encryption inside each managed application. In other embodiments, the IPC FTA files may be encrypted with a device network adapter identifier and/or an advertising identifier that is unique for each user account of each mobile application. IPC messages may also include a random fixed length preamble (e.g., 16 bytes) which may be ignored by the recipient of the IPC message but may be used to generate a different encrypted output with the same payload data. IPC messages may be encrypted before any network communication occurs with server 516. The IPC messages may also be hashed multiple different times (e.g., 10,000 iterations) in order for the data to be encrypted with a high degree of confidence.

In some embodiments, managed applications' data may be encrypted according to various different techniques. In some embodiments, data packets used for encryption referred to as secrets such as secret S1 and S2 may be received at the master application 501 from server 516 and/or the application controller. Such secrets S1 and S2 may be used as encryption keys used to encrypt the data used by the managed applications 502-504 and master application 501. Secrets S1 and S2 may be stored in password vaults or application isolated storage. In some embodiments, in addition to the secrets, PDID, the network adapter ID, and advertising ID may be used to further encrypt the managed applications' data according to encryption instructions of Microsoft APIs and/or FIPS compliant encryption algorithms. In some embodiments, the passcode may be used as a key encryption key to decrypt the stored secrets S1 and S2. The passcode, which is entered by the user and is a form of user entropy, may never be stored on the mobile device 500. Only a passcode validation message that is used to verify the passcode may be stored on the mobile device 500. In the absence of a passcode, the secrets S1 and S2 may be encrypted using the PDID or they may be placed in a password vault.

In some embodiments, each beacon may be time sensitive and device sensitive in order to add an additional level of security to the information stored in beacon 510. In addition to a shared passcode, a device identifier may be used in the generation of encryption keys and decryption keys used to encrypt and decrypt information to and from beacon 510. Adding a device identifier to the encryption of the beacon ensures that even if the beacon is hijacked by a malicious attacker, it cannot be decrypted at a device other than the mobile device on which it is intended to operate in, thereby securing the information stored in beacon 510. Similarly, beacon 510 may have a timestamp or a countdown timer associated with it which ensures that a beacon will be destroyed after a certain period of time. For example, once an application has retrieved state information from beacon 510, beacon 510's countdown timer may run out and cause the beacon to be destroyed. The application which just retrieved information from beacon 510 prior to its self-destruction may generate a new beacon identical to the previously destroyed beacon which has a countdown timer reset to its maximum value. The time period set in the countdown timer may be set by each application to a unique amount of time. For example, an application may set the countdown timer for a period of time required for a beacon to be communicated to its nearest neighbor and for the beacon to be replicated at the neighboring application after which point the original beacon may self-destruct. Such time sensitive timers may ensure that even if a beacon 510 is hijacked by a malicious attacker, as long as beacon 510 is not received by its target application within an expected period of time, beacon 510 may be destroyed.

In some embodiments, unique application specific device identifiers may be used to further encrypt communications between applications. A processor of mobile device 500 may generate such unique application specific device identifiers by generating a random number based on the device identifier of mobile device 500 and a managed or master application's identifier. Such unique application specific device identifiers may be unique for each logon session for a given application on the same mobile device. Different users of the same mobile device may be assigned different unique application specific device identifiers within the same application and the same user may be assigned different unique application specific device identifiers when enrolling their mobile device with different applications.

In some embodiments, a security group may set policies regarding the length of time of a beacon's countdown timer. For example, security group may set beacon 510 can only survive in an application for five seconds. Security group may set a policy such that beacon 510 may only be stored on mobile device 500 for two hours. Both of these countdown timer length of time restrictions may be in place at the same time. Other length of time restrictions may be treated similarly, including the length of time that the device is in use or idle. For example, the length of time restriction may instruct a managed application to allow storage on a device in use for only ten seconds. However, the length of time restriction may instruct the managed application to allow storage on an idle device for twenty seconds. If the device is idle or if the managed application is not in use, the managed application may process, in the background of the device, the length of time stored.

The length of time restriction may include a secondary criterion based on the size of state information stored in beacon 510. For example, if a particularly large beacon is sent to a managed application, the security group policies may allow that beacon to be available for a certain amount of time in order to preserve confidentiality of beacon 510, which may contain sensitive material.

The beacon 510 may also be protected for a known security threat on managed applications or on mobile device 500. Known security threats may include the presence of malware or other executable files present in mobile device 500. A security threat may also include a user attempting to debug beacon 510 or attempting to decrypt an encryption. Further, a known security threat may include the attempt, of a user in possession of beacon 510, to forward beacon 510 at another device or with an application at mobile device 500 that beacon 510 is not intended to be used at. A known security threat may encompass any security threat applicable to applications and mobile devices.

In some embodiments, when a managed application is launched by the user independently of any other applications, the managed application may retrieve state information by detecting other beacons present in the secure environment 507. For example, the managed application may detect other applications that can provide it with the necessary state information via beacons for its successful operation. The managed application may transmit test messages to other applications' using global unique identifiers. An active application may respond back to such a test message with beacon 510. Additionally, each beacon 510 may broadcast its presence throughout secure environment 507 so that other applications that wish to detect them to retrieve their state information may retrieve them quickly. Each beacon may broadcast its location, an indication of when it was last updated, and how much more time it has until it self-destructs. Each new application that launches may listen to such broadcast information from all the beacons present in secure environment 507 to detect which beacon to retrieve to best suit its needs. For example, an application may select to retrieve a beacon that will take the least amount to be retrieved. Another application may select a beacon that has been most recently updated.

In some embodiments, beacon 510 may be transmitted to an external server 516 remotely located from mobile device 500. Mobile device processor may transmit beacon 510 to server 516 from a managed application if there are no other managed applications or even unmanaged applications running on mobile device 500. Beacon 510 may be stored on external server 516 to preserve a copy of the state information until another managed application begins running in secure environment 507, at which point the mobile device processor may transmit beacon 510 from server 516 to the newly started managed application. The mobile device processor may adjust security settings such as device and time sensitivity policies associated with beacon 510 in order for the beacon to be stored safely in server 516 until it can be fully utilized later by a managed application. In some implementations, beacon 510 may only be transmitted to external 516 for storage if no other unmanaged application is running on mobile device 500. If mobile device processor detects that an unmanaged application is running on mobile device 500, then it may transmit beacon 510 to the unmanaged application first instead of server 516 for temporary storage until a managed application is launched in secure environment 507.

Beacon 510 may be transmitted from secure environment 507 to an unmanaged application running outside secure environment 507 via secure partition gateway 512. Beacon 510 may be transmitted from mobile device 500 to external server 516 via mobile device gateway 514. A mobile device processor may ensure that additional levels of security are added to beacon 510 as it passes through gateways 512 and 514. The passage of beacon 510 through gateways 512 and 514 may modify the beacon to relax self-destruction countdown timer and device sensitive rules applied to beacon 510 so that it can survive outside secure environment 507. Additional types of security and encryption may be added to beacon 510 as it passes through these gateways. Accordingly, when beacon 510 returns to secure environment 507 from external server 516 or from application 505, gateways 514 and 512 may strip these additional levels of security and add the device and time sensitive restrictions to beacon 510.

In some embodiments, copies of beacon 510 may reside in external server 516 for future retrieval. For example, the mobile device processor may store a backup moving beacon in the event that the mobile device 500 reboots unexpectedly, resulting in a forced restart of all mobile applications. In the event that such a forced application restart occurs, mobile device processor may transmit the copy of beacon 510 stored in external server 516 to each of the managed applications running on mobile device 500 including master application 501. In this manner, managed applications recovering from a forced restart may resume their state prior to the restart by downloading the necessary information from server 516's backup copy of beacon 510. Beacon 510 may not require an application to be actively running in the foreground of a mobile device screen to be transmitted. In fact, mobile device processor may transmit the server stored copy of beacon 510 to all managed applications recovering from a forced restart even while mobile device 500 is in a locked state. Each of the managed applications may retrieve the necessary information to resume their activities prior to the forced restart even while mobile device 500 is locked. In this manner, storing a beacon in an external server allows the state to be maintained even across system crashes and reboots.

In some embodiments, each managed application may periodically perform a check to determine whether its passcode is consistent with the passcode used by the master application. A master application may periodically transmit, to all managed applications, a passcode validation message with information indicative of the current passcode. For example, the master application may transmit a client key which will produce a desired result such as a validation completed message when paired with an application specific key generated using the shared passcode. If the managed application's passcode is synchronized with the master application, then the managed application's passcode check process will produce the desired validation completed message upon pairing of the application specific key with the client key. In another example, the passcode validation message may be a random number that is shared by the master application and each managed application. The random number is encrypted using an encryption key derived from the master application passcode. Each managed application may maintain a local copy of the passcode validation random number. Each managed application performing the passcode validation process may decrypt the received encrypted random number passcode validation message using its locally stored decryption key which is derived from its own passcode. If the master application and managed application share the same passcode, the decrypted passcode validation message number will match the passcode validation random number locally stored at the managed application. However, if there is a mismatch between the master application passcode and the managed application passcode, then the passcode validation checking process will not produce the desired result. In the event that there is a mismatch, the managed application may initiate a process to reset its passcode to be synchronized with the master application. After the passcode is successfully validated, the passcode may be used to decrypt the data encryption keys (e.g., secrets S1 and S2). The data encryption keys may be used to decrypt application data.

The passcode validation message along with a message indicating when the last passcode validation was performed may be sent in moving beacon 510 between master application 501 and any managed application 502-504. In the event of a passcode mismatch, the managed application may request the master application 501 to send the new passcode. Master application 501 may transmit information necessary to construct the new passcode in a moving beacon 510 to the requesting managed application. Beacon 510 may be encrypted, by the master application, using the old passcode that the requesting managed application is still using.

In some embodiments, the passcode validation check may be performed by passing, from the master application to each managed application, an indication of a time at which the passcode was last updated at the master application. Each managed application may compare the time that the master application passcode was last updated with the time that its own passcode was last updated. If the time that the master application passcode was last updated is the same as the time that the managed application's passcode was last updated, then the passcode validation process is completed. If the passcode update times mismatch, then the managed application may request the master application to provide it with the necessary information to reset its passcode.

In another embodiment, a passcode may be updated at master application 501 and the master application 501 may coordinate updating the passcode at each of the managed applications 502-504. For example, a user may enter a correct old passcode at master application 501. Master application 501 may contain the old passcode validation message corresponding to the old passcode. The old passcode validation message may be used by application 501 to validate the user entered old passcode at application 501. At this point, the user may input a new passcode at master application 501 for future use with master application 501 and managed applications 502-504. The mobile device processor may generate a new passcode validation message at master application 501 using the newly entered user passcode at application 501 which will be used to validate the passcode at applications 501-504 in the future. Encryption and decryption keys stored in application 501 may be re-encrypted at application 501 using the new passcode. State information in beacon 510 and application data in managed applications does not need to be re-encrypted each time the passcode changes but rather only the encryption and decryption keys need to be re-encrypted. State information and application data are still decrypted and encrypted using the same decryption and encryption keys at master application 501. Changing the passcode merely changes the encryption and decryption of the encryption and decryption keys themselves. The new pin validation message generated at master application 501 may be communicated to each managed application 502-504. Once a managed application is activated after the master application's passcode has changed, it will detect that the master application passcode has changed and it will retrieve the passcode validation message and the newly encrypted encryption and decryption keys. This will allow all managed applications 502-504 to maintain a synchronized passcode with master application 501 so that each application can retrieve and update beacon 510 which has its information encrypted using the shared encrypted encryption keys which are encrypted with shared passcodes.

The passcode may be reset at the master application as a result of various different events. The passcode may be set to reset after a predetermined period of time has elapsed. The passcode reset may be initiated by the user and/or the administrator of the enterprise. The passcode may be reset by the user in response to the user forgetting the passcode. The passcode may only be changed at the master application 501. For example, if the user of a managed application has forgotten the passcode and requests to reset the passcode within the context of the managed application, the master application 501 may launched in the foreground to reset the passcode. Once a passcode reset request is received, the user is prompted to enter the old passcode and/or other authentication information before entering a new passcode. Upon successful validation of the old passcode and/or authentication information, the new passcode may be accepted and a new passcode validation message may be generated by the master application 501. The data encryption keys may be re-encrypted using the new passcode. The data in each of the managed applications does not need to be re-encrypted upon a passcode change because the data encryption keys do not change. Rather the encryption of the data encryption keys changes upon change of the passcode. The new passcode validation message and newly encrypted data encryption keys may be communicated by the master application 501 to all the managed applications by setting an updated passcode encrypted time stamp in the shared secure storage of the mobile device 500. Once a managed application starts, it may detect that the passcode has expired and retrieve the new passcode validation message and newly encrypted data encryption keys from the master application 501. The user may then be challenged for the new passcode in the context of each managed application whenever the need for passcode based authentication is needed.

In some embodiments, if the user has forgotten the passcode and a request to reset the passcode is received and no passcode challenge is available at the managed application, the data for that application may be erased to maintain the security of the respective application. For example, if the application uses certificate based authentication and a request to reset some component of the certificate is received, the respective application may use existing APIs to wipe its application data according to the enterprise policy regarding data wipes in the event of a security breach.

In some embodiments, application framework management policies may be used to restrict the behavior of the master application 501 and managed applications 502-504 to conform to standards set by the enterprise. Different policies may apply to different managed applications and each managed applications' policies may be cached within the context of the respective mobile application. Each managed application may communicate with the master application 501 to retrieve per application enterprise policies. The master application 501 may communicate with the application controller to retrieve such enterprise policies. In some embodiments, the enterprise policies may be set to expire after a configurable period of time after which a policy refresh may be required. When a managed application's policy expires, the respective managed application may periodically sync with the master application 501 to retrieve and/or renew its policies. When the managed application is active on the mobile device 500, the policy may be set to expire after 1 day and when the managed application is inactive (e.g., has not been opened on the mobile device 500), its policy may be set to expire within a faster period of time (e.g., 1 hour) than when the application is active. The master application 501 may block usage of the managed application until an online authentication occurs for each managed application.

In some embodiments, the master application 501 may communicate with managed application while it is operating in the background without the user of the mobile device 500 using it actively. For example, the master application 501 may include a background task and communicate with the application controller from server 516 to receive updates, including policy updates, from the enterprise that it may need to communicate with the managed applications. Such information received from server 516 may be stored in the encrypted common storage of the mobile device 500. The master application 501 may transmit push notifications to each of the managed applications 502-504. In some embodiments, the master application 501 may communicate a refresh state to the managed applications 502-504. Each managed application, when it is actively executing on the mobile device 500, may check its state and request policies from the master application. An encrypted common storage on mobile device 500 may not include policy data but instead may include flags to indicate when each managed application's policy data was last refreshed with the master application 501. In other embodiments, each managed application may directly retrieve the policy updates at the encrypted common storage without invoking the master application 501.

In some embodiments, the common storage of mobile device 500 may be encrypted and prevent injection of data without user input. A shared document library may be provided in the common storage of the mobile device 500 for use by all managed applications and master application 501. A 'fake' file (e.g., non-user generated file mimicking several characteristics of a user generated file) may be generated in a folder of the shared document library to communicate data between the managed applications. If such a 'fake' file is deleted, the master application 501 may be notified and the master application 501 may recreate the deleted file. IPC data placed at the end of the 'fake' file may be marked such that no application may read the 'fake' file and use the IPC data. In addition, a limited amount of IPC data may also be placed in the metadata of shared files in the document library. The IPC data stored in such files may be encrypted in the same manner as other IPC data (e.g., by using PDID, device network adapter ID, etc.). When IPC data is added to such files, an encrypted timestamp may be placed in the IPC data. Such timestamps may be encrypted to avoid tempering. For example an old timestamp may cause a managed application to continue to using an outdated security policy or an outdated passcode. However, since encrypted timestamps provide a degree of resistance to tampering, each managed application may be able to use the timestamps to determine if the IPC data associated with the encrypted timestamp is outdated. Different timestamps may be used to identify expiration dates for policies, passcodes, and to indicate to a managed application that the managed application needs to communicate with the master application 501 to refresh its data. In some embodiments, an IPC background task may be generated as a shared service amongst all managed applications to coordinate the IPC messages between the various managed applications. Such an IPC background task may be modeled after the master application 501's background task.

Figure 6:
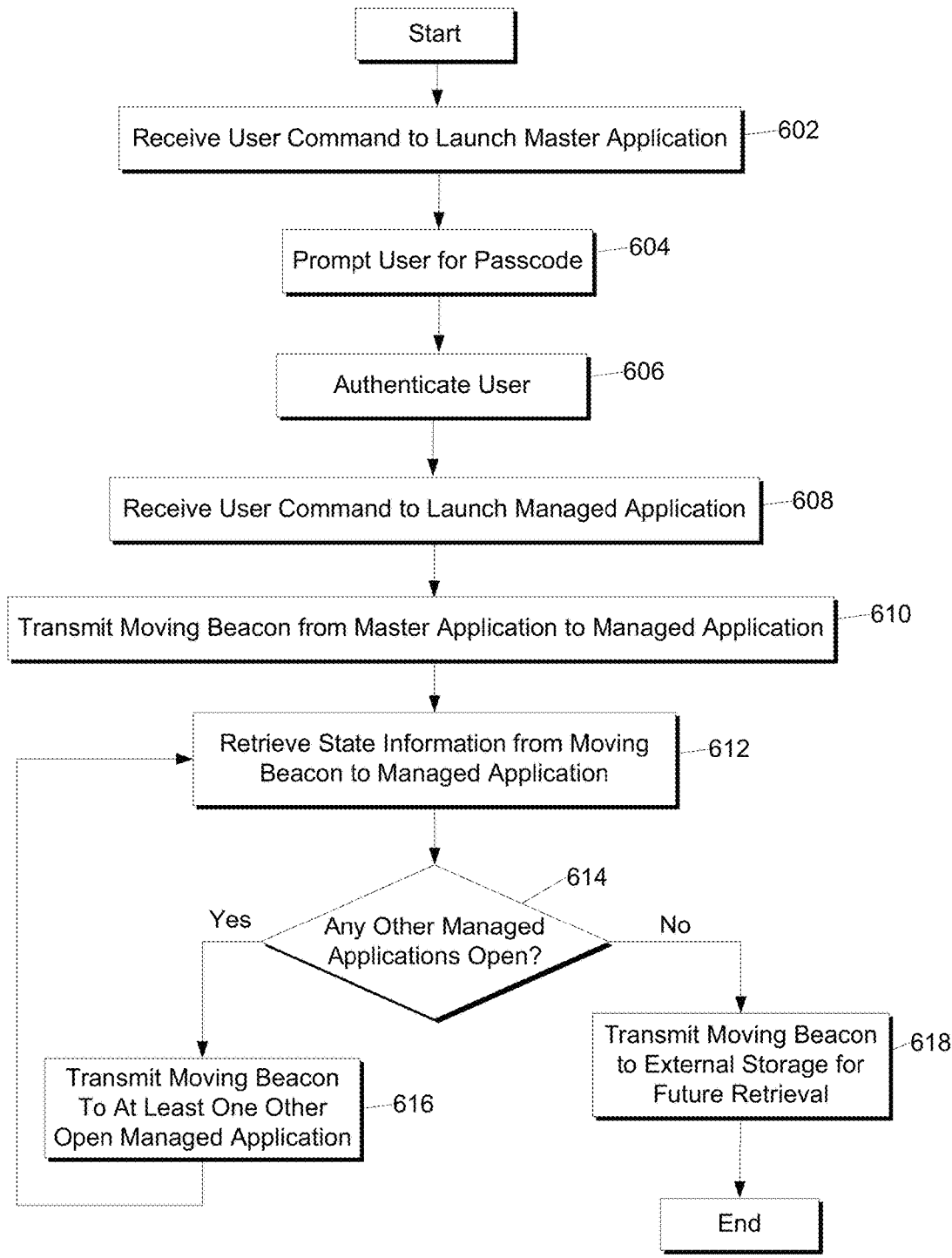
FIG. 6 depicts a flowchart that illustrates a method of communicating information between a master application and a managed application launched from the master application in accordance with one or more illustrative aspects described herein.

FIG. 6 depicts a flowchart that illustrates a method of communicating information between a master application and a managed application launched from the master application in accordance with one or more illustrative aspects discussed herein. In one or more embodiments, the method of FIG. 6 and/or one or more steps thereof may be performed by a mobile computing device (e.g., generic computing device 201). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 602 in which a mobile device may receive a user command to launch a master application. The user may instruct the mobile device processor to launch master application by interacting with the user interface of the mobile device. For example, the user may select an icon for the master application displayed on the display touchscreen of the mobile device. Upon receiving the user command to launch master application, mobile device processor may initialize a secure partition in the memory of the mobile device such as secure environment 507 of FIG. 5 in which the master application and any managed applications launched in the future may run. The mobile device may generate a security group and retrieve security group policies that will apply to each managed application and master application running in the secure partition. The mobile device may also start up secure application vaults for the master application that contain information necessary for user authentication.

In step 604, the mobile device may prompt the user to enter the passcode for the master application. The mobile device processor may generate for display a passcode entry dialog box on the display screen of the mobile device. Additionally or alternatively, the mobile device may also allow the user to enter the passcode vocally. The mobile device may process the inputted vocal passcode using a speech to text translation algorithm. Once the passcode has been entered, the user may have the option to verify it. The mobile device may also provide the user with an option to select an option to change the passcode if he has forgotten it. The mobile device may prompt the user to enter answers to previously set questions and upon successful entering of responses, the mobile device may send an email to the user's previously designated email address to reset the passcode.

In step 606, the mobile device may authenticate the user upon user entry of the passcode. The user device may check the passcode entered by the user in step 602 with a locally stored passcode validation message. Authentication is completed when the correctly entered passcode by the user is paired with the locally stored passcode validation message successfully. Once the mobile device determines that the user has entered the correct passcode, the user may be granted access to the secure partition and all other applications running within it. Upon successful user authentication, the mobile device may enroll the device with the user account. The master application may contact remote account servers to download the user account information and settings for the master application on the mobile device. For example, the mobile device may log in the user into multiple different managed applications and display information related to previous user activity using any of the managed applications controlled by the master application. The mobile device may also display a list of the previously accessed secure files and network files. The user may be granted access to network drives and networked files with reading and editing privileges. The mobile device may also display a list of all the managed applications associated with the user account with links to launch each of the managed applications in the master application display. The mobile device may also display a contact user support option in the master application display, the selection of which will dial or email the support staff assigned to the enrolled user account. Once the master application has been initiated, the user may interact with the master application to retrieve networked files, establish active sessions with networked servers etc. These actions may in turn modify the global state by establishing active session certificates, retrieving tokens, updating cookies, retrieving application management policy descriptors, etc. Such changes to the global state may be captured in a moving beacon. Such a moving beacon is encrypted, by the mobile device processor, at the master application using a key encryption key. The key encryption key may be encrypted using the master application passcode.

In step 608, the mobile device may receive a user command to launch a managed application. The user may select a link or an icon for a managed application from the master application display window. Alternatively, the user may have selected a link to launch a managed application independently of the master application. Once the mobile device receives a command to launch the managed application, the mobile device may contact a networked application server to retrieve files and content necessary to activate the managed application. The mobile device may also access the locally stored application data for the selected managed application and uses such data to generate the display of the managed application user interface on the mobile device display screen.

In step 610, the mobile device processor may transmit a moving beacon from the master application to the managed application. Once the managed application has begun initializing, a moving beacon generated at the master application provides the managed application with necessary state information to authenticate the user within the managed application, display the most relevant files, and establish an active session within the managed application without requiring information from the user that has already been supplied by the user to the master application. The moving beacon received at the managed application may be decrypted using encrypted key decryption keys stored in the managed application's data files. The key decryption key may be encrypted using the passcode shared by the master application and the managed application.

In step 612, the mobile device processor may retrieve state information from the moving beacon for use by the managed application. Once the moving beacon has been successfully decrypted, the managed application may download all relevant data from the moving beacon necessary for smooth execution of the managed application, such as passwords, session certificates, active session tokens, updated passcode, application management policy descriptors, liveliness information of other applications, information about which applications are about to be terminated, and updated information on which applications have newly launched. Having received the state information, the managed application may launch and the mobile device may generate a display of the managed application user interface using information from the moving beacon, networked application servers, and locally stored files for the managed application on the mobile device. The user may use the mobile device user interface (i.e., touchscreen, keypad, mouse) to interact with the managed application to retrieve networked files, establish active sessions with networked servers etc. These actions may in turn modify the global state by establishing additional active session certificates, retrieving tokens, updating cookies, etc. Such changes to the global state may be captured in the moving beacon.

In some embodiments, the moving beacon may be updated with changes to the state information at the managed application. In other embodiments, the moving beacon may be destroyed at the managed application and a new moving beacon may be generated at the managed application. In some implementations, multiple different copies of the moving beacon may be generated at the managed application for distribution to multiple different destinations such as remote servers, managed applications, and unmanaged applications. The new moving beacon may broadcast its location, how much more time it has until it self destructs, when it was last updated, to other applications in the secured partition. The moving beacon may be encrypted for transmission, by the mobile device, using the encryption key found in the managed application's data files.

In step 614, the mobile device may determine whether any additional managed applications are running. The mobile device may check its memory to see if there are any inactive managed applications that have been launched since the first managed application was launched to determine which application to send the moving beacon to.

In response to determining that there is at least one other open managed application, in step 616, the mobile device may transmit the moving beacon to the at least one other managed application that is currently running in the secured partition of the mobile device. If there are more than one managed applications running on the mobile device, then the mobile device may generate a moving beacon for each one of those managed applications and may transmit these moving beacons to each of the managed applications to update them with the latest state information.

If the mobile device determines that there are no managed applications open, in step 618, the mobile device may transmit the moving beacon to an external storage for future retrieval by managed applications that launch at a later point of time. For example, the mobile device may transmit the moving beacon to a remote server for storage until an application later requests a moving beacon. Alternatively, the mobile device may also transmit the moving beacon from the managed application to an unmanaged application running on the mobile device. Since the external server and the unmanaged application are outside the secure partition in which managed applications run, the managed application may modify the moving beacon so that it will require survive outside the secure partition in a secure manner. The mobile device may begin an inactivity timer as soon as the moving beacon is transmitted to such external storage. The mobile device may periodically send updated moving beacons to such locations, which may replace the previously sent moving beacons. In this manner, the most updated state information is always available for future retrieval when a managed application is opened and the currently running managed application has been terminated.

Figure 7:
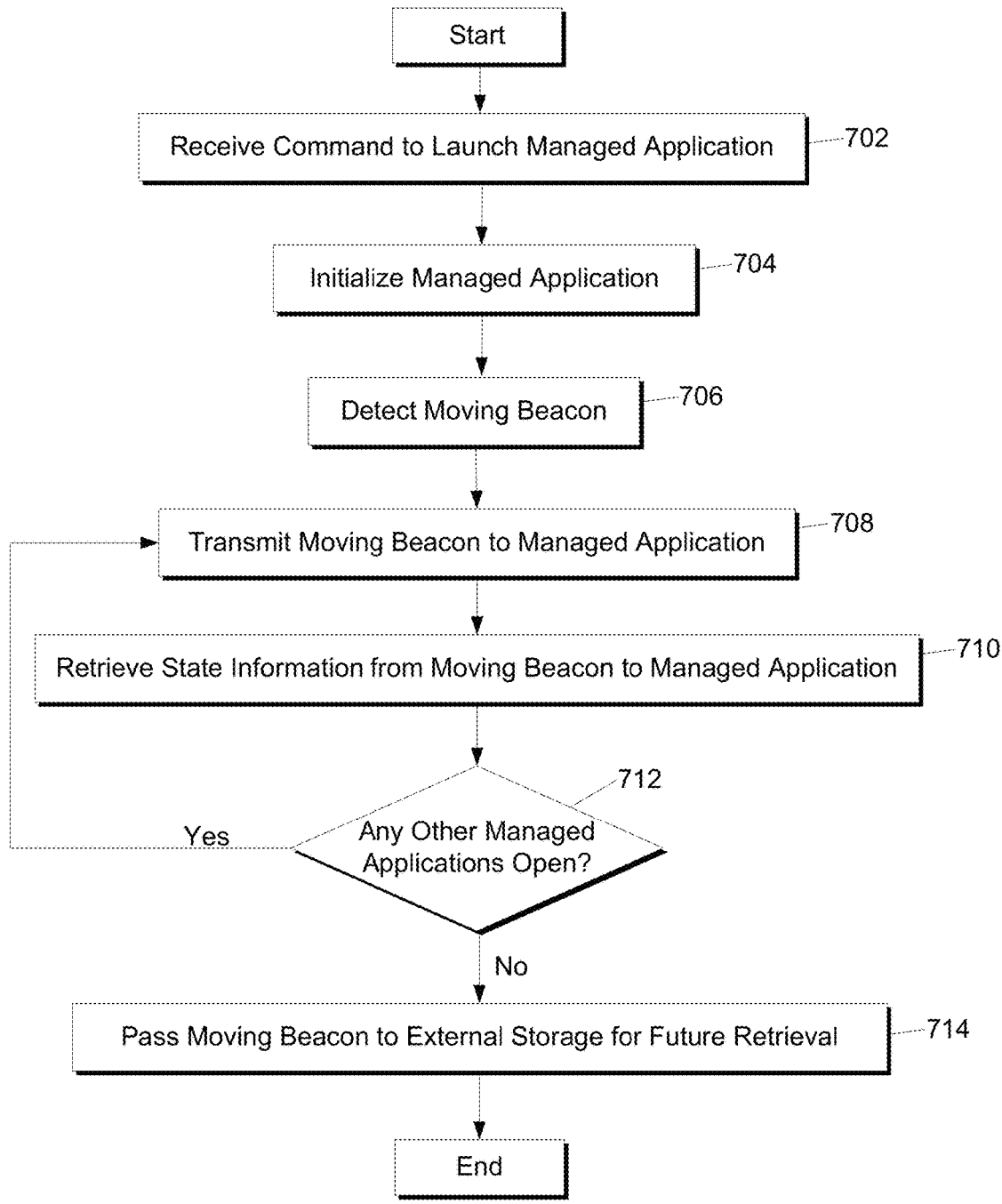
FIG. 7 depicts a flowchart that illustrates a method of communicating information amongst mobile applications using moving beacons in accordance with one or more illustrative aspects described herein.

FIG. 7 depicts a flowchart that illustrates a method of communicating information amongst mobile applications using moving beacons in accordance with one or more illustrative aspects discussed herein. In one or more embodiments, the method of FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 702 in which a mobile device may receive a command to launch a managed application. The user may instruct the mobile device processor to launch master application by interacting with the user interface of the mobile device. For example, the user may select an icon for the managed application displayed on the display touchscreen of the mobile device.

Upon receiving the user command to launch the managed application, in step 704, the mobile device may initialize the managed application. For example, the mobile device may contact a networked application server to retrieve files and content necessary to activate the managed application. The mobile device may also access the locally stored application data for the selected managed application and use such data to generate the display of the managed application user interface on the mobile device display screen.

In step 706, the mobile device may detect moving beacons. The mobile device may begin listening for broadcasts of moving beacons present in the secure partition. If there are no other managed applications or moving beacons present in the secure partition in which the newly launched managed application runs, the mobile device may determine if any unmanaged applications have moving beacons by listening for broadcasts of moving beacons from unmanaged applications. If there are no moving beacons located anywhere on the mobile device, the mobile device may identify the remote server at which a backup copy of the most recently updated moving beacon is stored. For example, the mobile device may identify the server address by checking a log maintained in a mobile device gateway such as mobile device gateway 514 of FIG. 5 for information on which server the last moving beacon was transmitted to.

Upon detecting the location of the most updated moving beacon, in step 708, the mobile device may transmit the moving beacon from the detected location to the managed application requesting the beacon. The mobile device may identify the fastest path by which to transmit the detected beacon through the network of applications using a spanning tree or election type algorithm and transmit the moving beacon to the requesting managed application on such an identified path.

Once the moving beacon has been transmitted to the managed application, in step 710, the mobile device may retrieve the state information from the moving beacon for the managed application. The moving beacon received at the managed application may be decrypted using decryption keys stored in the managed application's data files. The decryption key may be based on the managed application's passcode. Once the moving beacon has been successfully decrypted, the managed application may download all relevant data from the moving beacon necessary for smooth execution of the managed application, such as passwords, session certificates, active session tokens, updated passcode, application management policy descriptors, liveliness information of other applications, information about which applications are about to be terminated, and updated information on which applications have newly launched. Having received the state information, the managed application may launch and the mobile device may generate a display of the managed application user interface using information from the moving beacon, networked application servers, and locally stored files for the managed application on the mobile device. The user may use the mobile device user interface (i.e., touchscreen, keypad, mouse) to interact with the managed application to retrieve networked files, establish active sessions with networked servers etc. These actions may in turn modify the global state by establishing additional active session certificates, retrieving tokens, updating cookies, etc. Such changes to the global state may be captured in the moving beacon. In some embodiments, the moving beacon may be updated with changes to the state information at the managed application. In other embodiments, the moving beacon may be destroyed at the managed application and a new moving beacon may be generated at the managed application. The moving beacon may be encrypted for transmission, by the mobile device, using the encryption key found in the managed application's data files.

In step 712, the mobile device may determine whether any additional managed applications are running. The mobile device may check its memory to see if there are any inactive managed applications that have been launched since the first managed application was launched to determine which application to send the moving beacon to.

In response to determining that there is at least one other open managed application, the method may return to step 708 where the mobile device may again transmit the moving beacon to the open managed application running in the secured partition of the mobile device.

If the mobile device determines that there are no managed applications open, in step 714, the mobile device may transmit the moving beacon to an external storage for future retrieval by managed applications that launch at a later point of time. For example, the mobile device may transmit the moving beacon to a remote server for storage until an application later requests a moving beacon. Alternatively, the mobile device may also transmit the moving beacon from the managed application to an unmanaged application running on the mobile device. In this manner, the most updated state information is always available for future retrieval when a managed application is opened and the currently running managed application has been terminated.

Additional Illustrative Embodiments

In some embodiments, a mobile device processor may determine that a plurality of applications are executing on the mobile device. The processor may identify a first application and a second application use a shared passcode to encrypt key encryption keys, which are then used to encrypt information about a persistent state and application data. The processor may generate a moving beacon that includes first encrypted information. The processor may maintain state information across the plurality of applications running either simultaneously or at different times than each other on the mobile device beyond the lifetime of any one of the applications by transmitting the moving beacon from the first application to the second application before the first application's lifetime is completed. The moving beacon may provide information related to the last active state of the first application to the second application.

In some embodiments, the moving beacon may be received at the second application and the first encrypted information may be used to derive second encrypted information at the second application, which may contain updates to the first state information based on activities of the second application. The processor may generate a second moving beacon that includes the second encrypted information and transmit the second moving beacon from the second application to a third application.

In some embodiments, encrypted state information within moving beacons may be encrypted with a timestamp such that the encrypted state information may expire after a preset period of time once the encrypted state information has been received at the target application (i.e., the second application). The preset period of time may be greater than the transmission time of the moving beacon from the first application to the second application or from the first application to a remote or local storage unit. The encrypted state information may also be encrypted with device specific identifiers such that the encrypted state information may only be decrypted at the mobile device.

In some embodiments, a moving beacon may include authentication information comprising at least one of: a password, a security certificate, information used to encrypt encryption keys, active session tokens, application management policy descriptors, PIN or passcode validator, encrypted encryption keys, logging or application usage information, and device check URLs.

In some embodiments, the first application and the second application may be managed by a master application and share the same passcode as the master application. A passcode validation message may be received at the first application from the master application at a first and second managed application. Such a passcode validation message may be generated by the master application using the passcode set at the master application and communicated by the master application to the first and second managed applications. The first application may pair a user entered passcode at the first application with the received passcode validation message to authenticate a user. For example, if the user entered passcode successfully pairs with the passcode validation message, then the user can be logged in to the first application.

In some embodiments, the shared passcode may be used to encrypt key encryption and key decryption keys. The key encryption and key decryption keys may be used to encrypt and decrypt the encrypted state information and application data stored in applications, local storage, and remote storage. When the passcode is reset at the master application, a new passcode validation message and new key encryption and key decryption keys encrypted with the new passcode are generated by the master application and communicated to each application in moving beacons. These new key encryption and key decryption keys may be used to encrypt and decrypt state information and application data into beacons at the managed applications.

In some embodiments, the first application may be a managed application and the second application may be an unmanaged application running on the mobile device. The managed application may run within a secure partition and the unmanaged application may run outside the secured partition but information may be exchanged within these applications using moving beacons. The unmanaged application may be launched from the managed application and the first encrypted information may be transmitted from the first application to the second application along with the command to launch the second application.

In some embodiments, the mobile device processor may identify that a first managed application and a second managed application that are both running on the mobile device use a shared passcode. The processor may encrypt state information present in the first managed application using the passcode, resulting in encrypted state information. The processor may generate, at the first managed application, a beacon that includes the encrypted state information for transmission to other applications in order to preserve the state information after termination of the first managed application. The processor may transmit the beacon from the first managed application to the second managed application.

In some embodiments, a system for communicating information between applications may comprise at least one processor and at least one memory storing computer readable instructions that, when executed by the at least one processor, may cause the system to determine that a plurality of applications are running on the mobile device and determine that each application of the plurality of applications uses a shared passcode to encrypt information about a persistent state. The computer readable instructions, when executed by the at least one processor, may cause the system to generate a first beacon that includes first encrypted state information. The computer readable instructions, when executed by the at least one processor, may also cause the system to maintain state information across the plurality of applications beyond a lifetime of any one of the plurality of applications by transmitting the first beacon from a first application to a second application before a lifetime of the first application is completed.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a mobile device, a plurality of mobile applications executing on the mobile device, wherein the plurality of mobile applications comprises a first mobile application and a second mobile application, and wherein the first mobile application and the second mobile application share a passcode to encrypt application data;
   storing, by the mobile device, an encrypted first state information of the first mobile application on a beacon, wherein the beacon is configured to preserve the encrypted first state information of the first mobile application beyond an execution lifetime of the first mobile application, and wherein the beacon is further configured to preserve an encrypted second state information of the second mobile application; and
   transmitting, by the mobile device, from the first mobile application, and to the second mobile application, the beacon in response to determining that the first mobile application switched to a background execution mode and that the second mobile application switched to a foreground execution mode.

2. The method of claim 1, further comprising:
   generating, by the mobile device, the encrypted second state information of the second mobile application; and
   modifying, by the mobile device, the beacon to comprise the encrypted second state information.

3. The method of claim 2, further comprising:
   transmitting, by the mobile device, from the second mobile application, and to the first mobile application, the beacon in response to determining that the first mobile application switched to a foreground execution mode and that the second mobile application switched to a background execution mode; and
   restoring, by the mobile device, the first mobile application to a previous state using the encrypted first state information.

4. The method of claim 2, further comprising:
   transmitting, by the mobile device, from the second mobile application, and to a third mobile application, the beacon in response to determining that the second mobile application switched to a background execution mode and that the third mobile application switched to a foreground execution mode.

5. The method of claim 2, further comprising:
transmitting, by the mobile device, from the second mobile application, and to a third mobile application, the beacon in response to determining that the second mobile application switched to a background execution mode and that the third mobile application has launched.

6. The method of claim 2, wherein the generating the encrypted second state information of the second mobile application comprises:
generating, by the mobile device, an encrypted second state information of the second mobile application using the encrypted first state information; and
modifying, by the mobile device, the encrypted first state information based on a second state of the second mobile application.

7. The method of claim 1, further comprising:
encrypting, by the mobile device, a first state information of the first mobile application with a secret specific to the mobile device, to create the encrypted first state information of the first mobile application, wherein the encrypted first state information is configured to be decrypted by processes executing on the mobile device.

8. The method of claim 7, further comprising:
preventing, by the mobile device, transmission of a beacon, comprising the encrypted first state information encrypted with the secret specific to the mobile device, to a location external to the mobile device.

9. The method of claim 1, further comprising:
encrypting, by the mobile device, a first state information of the first mobile application with a secret specific to a user of the mobile device, to create the encrypted first state information of the first mobile application, wherein the encrypted first state information is configured to be decrypted by processes associated with the user of the mobile device.

10. The method of claim 1, further comprising:
transmitting, by the mobile device, the beacon to a shared location accessible by the plurality of mobile applications, wherein the shared location is external to the mobile device.

11. The method of claim 1, further comprising updating, by the mobile device, the second mobile application with secure information from the beacon.

12. The method of claim 11, wherein the secure information comprises one or more of authentication credentials, passwords, security certificates, encrypted key encryption keys, passcodes, and personal identification numbers.

13. The method of claim 1, wherein the first mobile application and the second mobile application are configured to operate within a secure partition of the mobile device.

14. The method of claim 13, wherein the beacon is further configured to include information relating to a current global state within the secure partition of the mobile device.

15. A method comprising:
determining, by a mobile device, a plurality of mobile applications executing on the mobile device, wherein the plurality of mobile applications comprises a first mobile application and a second mobile application, and wherein the first mobile application and the second mobile application share a passcode to encrypt application data;
storing, by the mobile device, an encrypted first state information of the first mobile application on a beacon, wherein the beacon is configured to preserve the encrypted first state information of the first mobile application beyond an execution lifetime of the first mobile application, and wherein the beacon is configured to preserve an encrypted second state information of the second mobile application; and
transmitting, by the mobile device, from the first mobile application, and to the second mobile application, the beacon in response to determining that the second mobile application has launched.

16. The method of claim 15, further comprising:
generating, by the mobile device, the encrypted second state information of the second mobile application; and
modifying, by the mobile device, the beacon to comprise the encrypted second state information.

17. The method of claim 16, further comprising:
transmitting, by the mobile device, from the second mobile application, and to the first mobile application, the beacon in response to determining that the second mobile application has terminated; and
restoring, by the mobile device, the first mobile application to a previous state using the encrypted first state information.

18. The method of claim 16, wherein the generating the encrypted second state information of the second mobile application comprises:
generating, by the mobile device, an encrypted second state information of the second mobile application using the encrypted first state information; and
modifying, by the mobile device, the encrypted first state information based on a second state of the second mobile application.

19. The method of claim 15, further comprising:
granting access to the second mobile application to one or more computing resources using one or more credentials obtained from the encrypted first state information.

20. The method of claim 15, further comprising:
encrypting, by the mobile device, a first state information of the first mobile application with a secret specific to the mobile device, to create the encrypted first state information of the first mobile application, wherein the encrypted first state information is configured to be decrypted by processes executing on the mobile device.

21. The method of claim 15, further comprising:
encrypting, by the mobile device, a first state information of the first mobile application with a secret specific to a user of the mobile device, to create the encrypted first state information of the first mobile application, wherein the encrypted first state information is configured to be decrypted by processes associated with the user of the mobile device.

22. An apparatus comprising:
at least one processor; and
at least one memory storing computer readable instructions that, when executed by the at least one processor, causes the apparatus to:
determine a plurality of applications executing on the apparatus, wherein the plurality of applications comprises a first application and a second application, and wherein the first application and the second application share a passcode to encrypt application data;
store an encrypted first state information of the first application on a beacon, wherein the beacon is configured to preserve the encrypted first state information of the first application beyond an execution lifetime of the first application, and wherein the beacon is configured to preserve an encrypted second state information of the second application; and transmit, from the first application, and to the second application, the beacon in response to determining that the first application switched to a background execution mode and that the second application switched to a foreground execution mode.

23. The apparatus of claim 22, wherein the at least one memory comprises further computer readable instructions that, when executed by the at least one processor, further causes the apparatus to:

transmit, from the second application, and to the first application, the beacon in response to determining that the first application switched to a foreground execution mode and that the second application switched to a background execution mode; and restore the first application to a previous state using the encrypted first state information.

24. The apparatus of claim 22, wherein the at least one memory comprises further computer readable instructions that, when executed by the at least one processor, further causes the apparatus to:

granting access to the second application to one or more computing resources using one or more credentials obtained from the encrypted first state information.

* * * * *